United States Patent [19]

Hashiguchi et al.

[11] Patent Number: 5,602,939
[45] Date of Patent: Feb. 11, 1997

[54] SPECIFIC DOCUMENT DISCRIMINATING APPARATUS AND IMAGE READING APPARATUS USING IT THEREIN

[75] Inventors: Tadato Hashiguchi; Takeshi Ukai, both of Yokohama, Japan

[73] Assignee: Richo Company, Ltd., Tokyo, Japan

[21] Appl. No.: 307,576

[22] PCT Filed: Jan. 26, 1994

[86] PCT No.: PCT/JP94/00100

§ 371 Date: Sep. 26, 1994

§ 102(e) Date: Sep. 26, 1994

[87] PCT Pub. No.: WO94/17623

PCT Pub. Date: Aug. 4, 1994

[30] Foreign Application Priority Data

Jan. 28, 1993 [JP] Japan .................................. 5-032703
Sep. 17, 1993 [JP] Japan .................................. 5-254707

[51] Int. Cl.$^6$ ................................................ G06K 9/00
[52] U.S. Cl. ..................... 382/162; 283/88; 382/112; 382/291; 399/15
[58] Field of Search ............................. 358/526, 538, 358/453, 462, 464; 382/1, 7, 16, 17, 10, 28, 38, 48, 58, 112, 162, 207, 312, 291; 355/201; 283/85, 88, 87

[56] References Cited

U.S. PATENT DOCUMENTS

| | | | |
|---|---|---|---|
| 3,977,785 | 8/1976 | Harris | 355/133 |
| 4,486,090 | 12/1984 | Warhol | 355/3 R |
| 4,586,811 | 5/1986 | Kubo et al. | 355/14 R |
| 4,723,149 | 2/1988 | Harada | 355/14 R |
| 5,010,580 | 4/1991 | Vincent et al. | 382/17 |
| 5,014,857 | 5/1991 | Kondo | 209/534 |
| 5,068,913 | 11/1991 | Sugiura | 382/61 |
| 5,266,805 | 11/1993 | Edgar | 250/330 |
| 5,367,577 | 11/1994 | Gotaas | 382/7 |

FOREIGN PATENT DOCUMENTS

| | | |
|---|---|---|
| 0493961 | 7/1992 | European Pat. Off. |
| 0594446 | 4/1994 | European Pat. Off. |
| 0606654 | 7/1994 | European Pat. Off. |
| 0608118 | 7/1994 | European Pat. Off. |
| 3917419 | 12/1989 | Germany. |
| WO89/00319 | 1/1989 | WIPO. |

*Primary Examiner*—Joseph Muncuso
*Attorney, Agent, or Firm*—Oblon, Spivak, McClelland, Maier & Neustadt, P.C.

[57] ABSTRACT

The present invention provides an invisible light image detecting means for detecting an invisible light region image formed by using colorless paint in an invisible light region, and a discriminating means for discriminating a general document from a specific one by using the image data detected by said invisible light image detecting means, thus discrimination between a general document and a specific one being executed accurately and without fail.

8 Claims, 7 Drawing Sheets

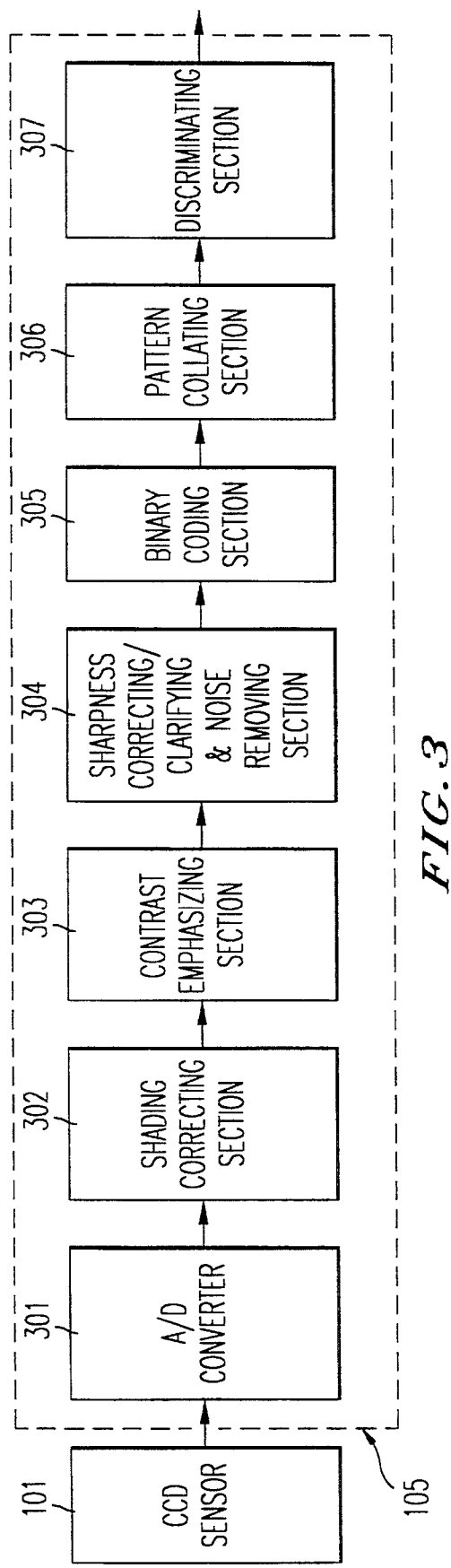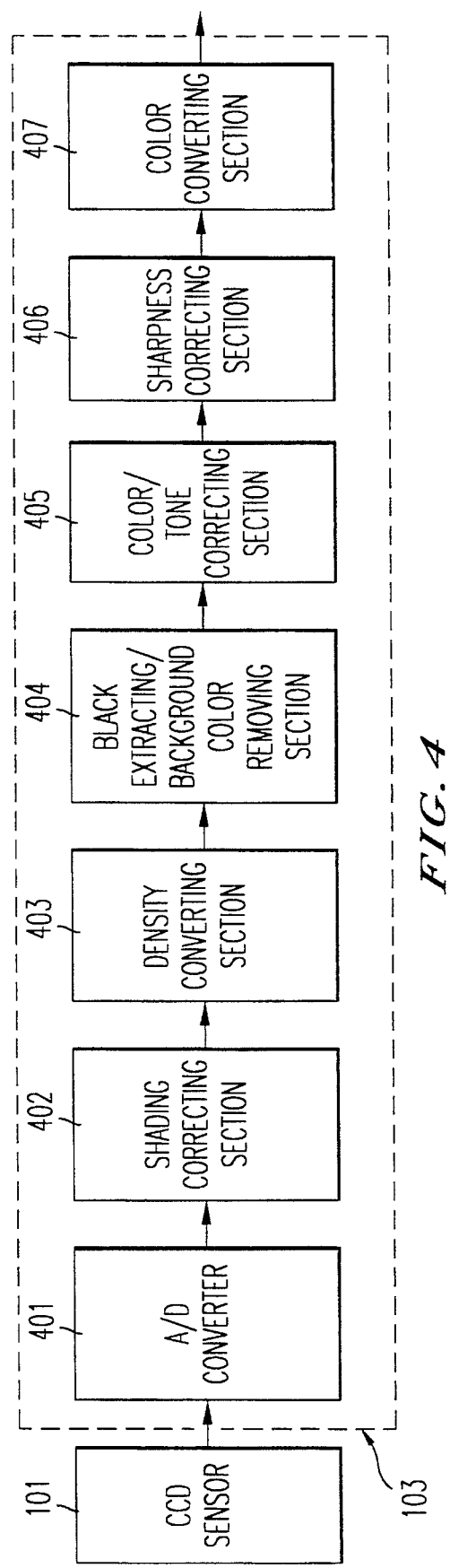
FIG. 3
FIG. 4

SPECIFIC DOCUMENT DISCRIMINATING APPARATUS AND IMAGE READING APPARATUS USING IT THEREIN

TECHNICAL FIELD

The present invention relates to a specific document discriminating apparatus which makes a determination as to whether read image data is a specific document or not, and an image reading apparatus using it therein.

BACKGROUND OF THE INVENTION

In recent years, in association with progress in the field of image processing technology, now it is possible to make so elaborate copies of bills that copied bills made by a color copying machine can not be distinguished from actual ones. For this reason, now serious efforts are made to develop a specific document discriminating apparatus which can discriminate specific document of bills, securities and the equivalent for preventing the specific document being used for practical purposes.

In a specific document discriminating apparatus, the technology based on the pattern-matching method as described, for instance, in Japanese Patent Laid Open Publication No. 83571/1990 with the title of "Image Recognizing Apparatus" has generally been used. In this apparatus, determination as to whether a document is a specific one or not is made by comparing input image data to pattern data registered previously.

With the conventional type of technology as described above, a particular portion of a specific document is read by checking with visible rays, and read image data is collated and discriminated by means of the pattern matching method, but in this case, however, successful recognition ratio is not 100%, and also general document often includes areas similar to the specific portion of specific document, so it is not always possible to distinguish a specific document from a general document.

If for instance, a precision in discrimination (a threshold value used for discrimination) is raised to prevent a specific document from being overlooked, a percentage of error recognition in which a general document is read as a specific document increases, and on the contrary if a precision in discrimination is lowered to prevent a general document from being read as a specific document, a percentage of recognition in which a specific document is read as a general document goes higher. It is an object of the present invention to make it possible to accurately distinguish a specific document from a general document without fail.

SUMMARY OF THE INVENTION

In order to achieve the object as described above, the present invention provides a specific document discriminating apparatus comprising invisible rays region image detecting means for detecting an invisible rays region image formed with non-color coating varnish emitting rays in an invisible rays area, and discriminating means for making a determination as to whether a document is a specific document or not using the image data detected by the invisible rays region image detecting means. A specific document discriminating apparatus according to the present invention and an image reading apparatus using it therein detects a mark (an invisible rays region image) put on a specific document with non-color coating varnish emitting rays in an invisible rays area (for instance, an infrared rays region), and makes a determination as to whether a document is a specified one or not using the read image data. With this configuration, discrimination between a general document and a specific one can be executed accurately.

Also it is an object of the present invention, in order to achieve the object as described above, to provide an image reading apparatus having a function to make a determination as to whether read image data is a specific document or not comprising infrared rays reading means for reading an infrared rays region image formed with non-color coating varnish emitting rays in an infrared rays region and discriminating means for making a determination as to whether a document is a specific one or not using the image data read by the infrared rays reading means. With this configuration, discrimination between a general document and a specific one can be executed accurately.

It should be noted that the above-described infrared ray reading means preferably comprises a CCD sensor (solid state image pick-up chip) which can sense infrared rays. Also the infrared rays reading means should preferably comprise a CCD sensor (solid state image pick-up chip) which can sense both visible rays and infrared rays. With this configuration, an infrared or an ultra-violet ray region image formed by using colorless paint in an invisible ray region can accurately be read.

Also it is preferable that the infrared rays reading means can recognize each of infrared rays, R (Red), G (Green), and B (Blue) individually by switching a filter. Also when an operation to read an image with visible rays is repeated several times, the reading operation by the infrared rays reading means is preferably executed in the middle of the operations above. With this configuration, replacement of a document with other one can be prevented.

BRIEF DESCRIPTION OF THE DRAWINGS

FIG. 3 is a block diagram illustrating the configuration of a specific document discriminating section;

FIG. 4 is a block diagram illustrating the configuration of an image processing section;

DESCRIPTION OF THE PREFERRED EMBODIMENTS

Detailed description is made hereinafter for a specific document discriminating apparatus according to the present invention and an image reading apparatus using it therein with reference to related drawings.

Figure 1:
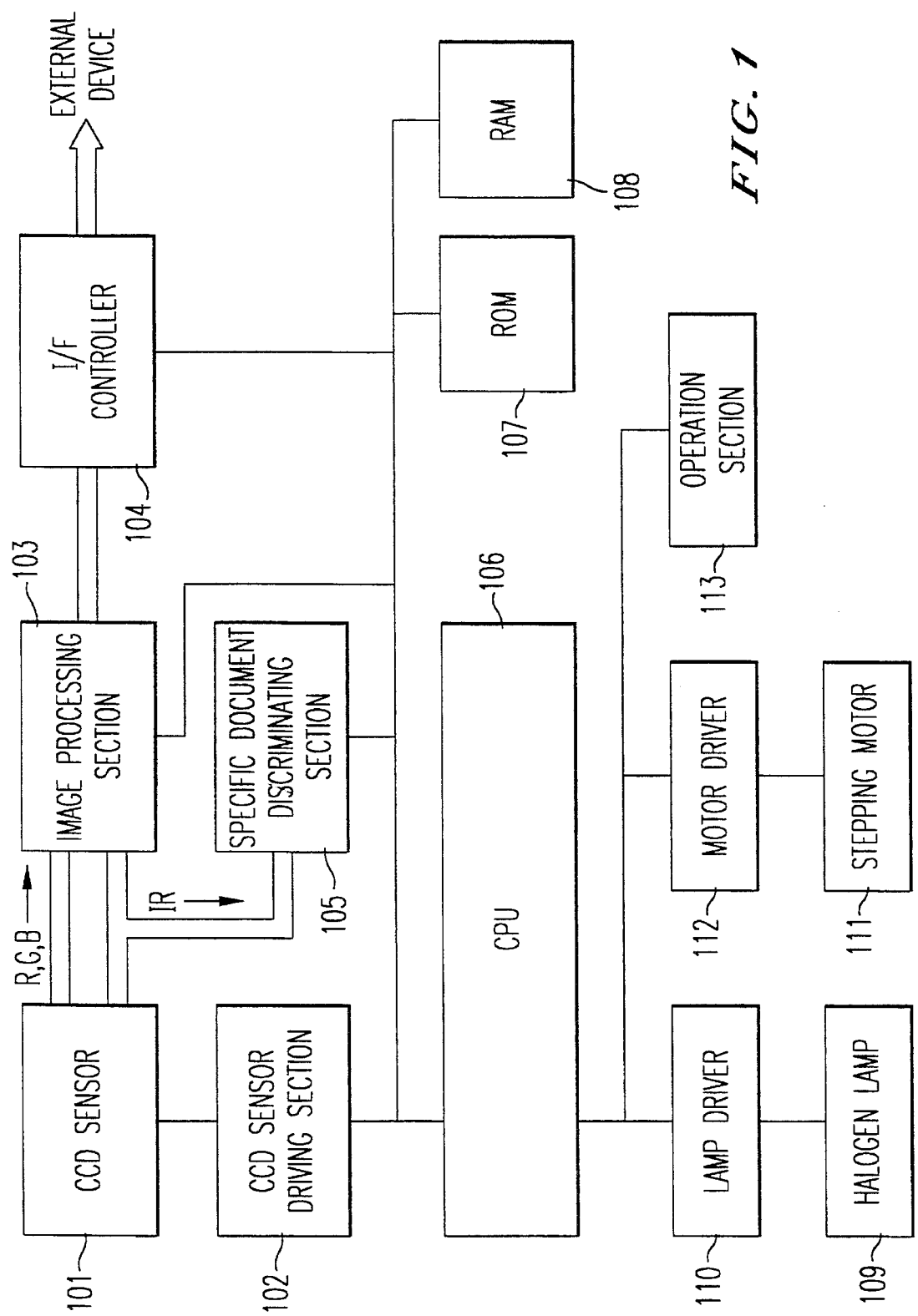
FIG. 1 is a block diagram illustrating the configuration of a scanner according to Embodiment 1.

FIG. 1 is a drawing illustrating the configuration of a scanner in which the present invention is implemented, comprising a CCD sensor 101 (charge coupled device) into which reflected rays of rays irradiated onto a document is supplied as input and which recognizes image data by converting the reflected rays to electric signals, a CCD sensor driving section 102 which drives the CCD sensor 101, an image processing section 103 which executes various types of image processing described hereinafter, an I/F (interface) controller 104 which outputs the image data processed by the image processing section 103 to an external device such as a host computer, a specific document discriminating section 105 which makes a determination as to whether a document is a specific one or not, a CPU 106 controlling the entire system, a ROM 107 in which various types of programs to be executed by the CPU 106 as well as data are stored, a RAM 108 used as a work area, a halogen lamp 109 which is a rays source to expose a document to the rays, a lamp driver 110 to drive the halogen lamp 109, a stepping motor 111 to move an optical system (scanning), a motor driver 112 to drive the stepping motor 111, and an operation section 113 for executing a various types of operation.

Figure 2:
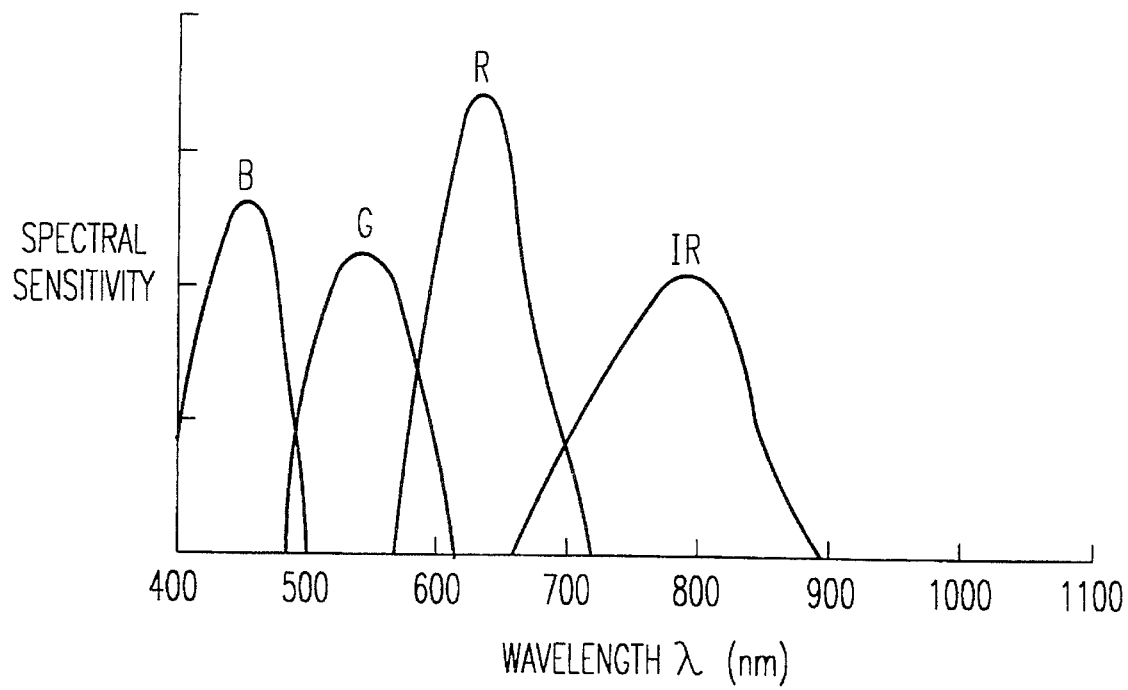
FIG. 2 is a graph illustrating spectral characteristics of R,G,B, and IR rays read by a CCD sensor according to Embodiment 1.

FIG. 2 is a drawing illustrating spectral characteristics of R,G,B, and IR rays read by the CCD sensor 101. As shown in this figure, the CCD sensor 101 is a CCD sensor which can sense infrared rays, into which IR (infrared rays), R (Red), G (Green) or B (Blue) rays are provided as input, and which converts the input rays to electric signals. Herein, the infrared ray is defined as light having a wave length of 700 nm or more.

FIG. 3 is a drawing illustrating the configuration of the specific document discriminating section 105, comprising an A/D convertor 301 into which an analog signal for IR detected by the CCD sensor 101 is supplied as input and which converts the analog signal to a digital signal, a shading correcting section 302 which corrects irregularities such as that of illumination by a halogen lamp 109 and that of sensitivity of each pixel in the CCD sensor 101, a contrast emphasizing section 303 which adjusts contrast between a hi-lighted portion and a shadow portion, a sharpness correcting/clarifying and noise removing section 304 which executes operations for sharpness correction, clarification, and noise removal with a smoothing filter and an edge emphasizing filter, a binary coding section 305 which converts image data to binary coded data, to a pattern collating section 306 of which the binary coded image data is supplied as input and which collates the image data referring to patterns registered previously, and a discriminating section 307 which makes a determination, depending on the result of collation by the pattern collating section 306, as to whether the image data matches any of the registered patterns or not.

FIG. 4 is a drawing illustrating configuration of the image processing section 103; comprising an A/D convertor 401 to which analog signals for R,G, and B detected by the CCD sensor 101 are supplied as input, and which converts the analog signals to digital ones, a shading correcting section 402 which corrects irregularities such as that of illumination by the halogen lamp 109 and that of sensitivity of each pixel in the CCD sensor 101, a density converting section 403 which converts brightness data to density data, a black extracting/background color removing section 404 which extracts black color and removes the background color from the density data for R, G and B, a color/tone correcting section 405 which corrects colors and tones, a sharpness correcting section 406 which executes sharpness correction, and a color converting section 407 which converts color data for R, G, and B to Y, M and C respectively.

Figure 5A:
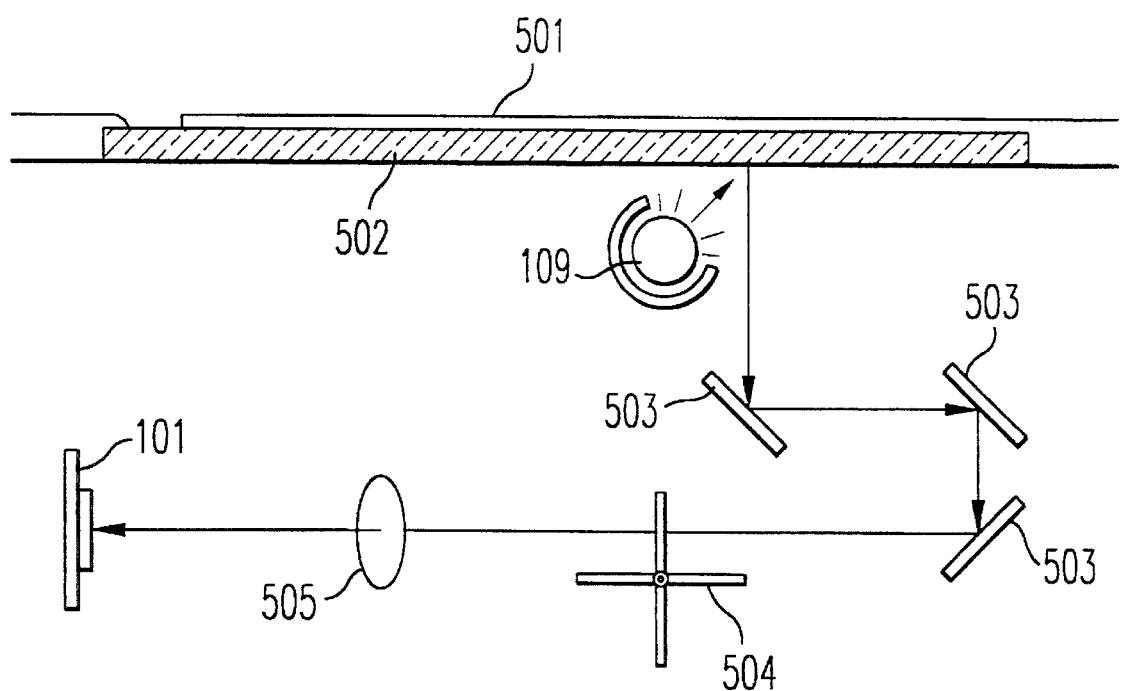
FIGS. 5a and b are an explanation view illustrating an optical system of the scanner according to Embodiment 1.
Figure 5B:
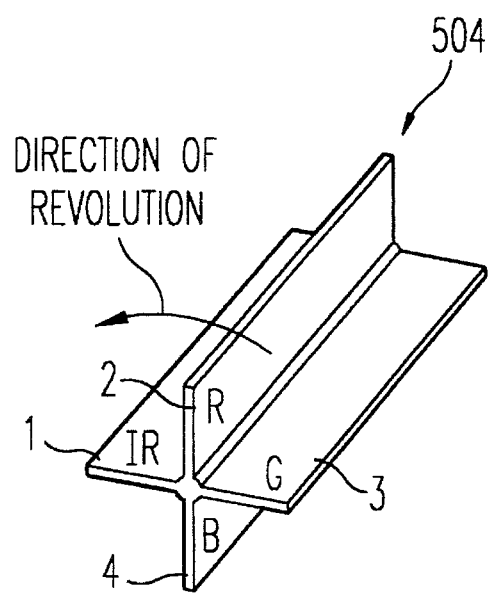

FIG. 5(a) and FIG. 5(b) show an optical system in a scanner according to Embodiment 1 respectively. In these figures, designated at 501 is a color document to be read, which is placed on a document mount contact glass 502. Light irradiated from the halogen lamp 109 and having a wave length up to an infrared rays area is reflected by a document 501 and an image formed by the reflected rays is focused on the CCD sensor 101 via a mirror 503, an individual ray pick-up filter 504, and a lens 505. The individual ray pick-up filter 504 comprises 4 filters for IR, R, G, and B as shown in FIG. 5(b), and picks up each of IR, R, G and B independently by switching these filters. In Embodiment 1, only IR is picked up by the IR filter 1 in the first scan, and then the filters 2, 3, and 4 are turned in this order in each scan to pick up image data for R, G and B successively.

Description is made hereinafter for a specific document discriminating apparatus having the configuration as described above. When an operator places the document 501 on the document mount contact glass 502 and presses a start key (not shown) in the operating section 113, the CPU 106 reads out a control program from the ROM 107 and starts an operation for reading an image.

Figure 6:
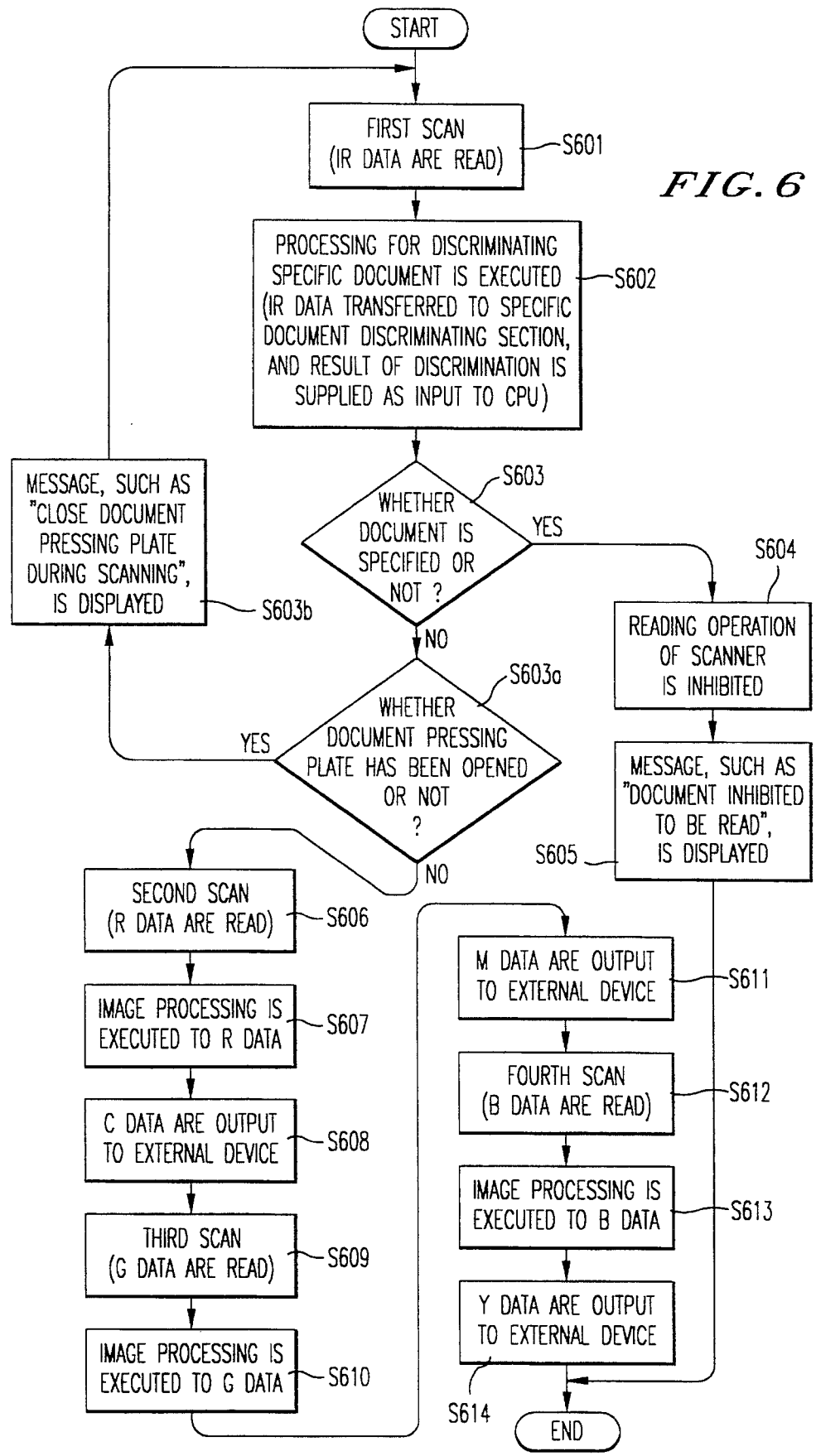
FIG. 6 is a flow chart illustrating a control program according to Embodiment 1.

FIG. 6 is a drawing illustrating a control program, and according to this control program, at first the first scan is executed using the IR filter of the individual ray pick-up filter 504, and image data in an infrared rays region (image formed with non-color coating varnish emitting rays in an infrared rays area: described IR data hereinafter) is read by the CCD sensor (S601). The IR data in a range from 700 nm to 1000 nm is used. Then, the IR data is transferred to the specific document discriminating section 105, wherein a processing for discriminating a specific document is executed, and the result of discrimination is supplied as input (S602) to the CPU 106.

Next description is made for a processing for discriminating a specific document in the specific document discriminating section 105. In the specific document discriminating section 105, a specified image processing is executed to the IR data by the A/D convertor 301, shading correcting section 302, contrast emphasizing section 303, and sharpness correcting/clarifying and noise removing section 304, the image data is converted to binary coded data by the binary coding section 305, the IR data is collated in the pattern collating section 306 by referring to pattern data (patterns of infrared rays region images each formed with non-color coating varnish emitting rays in an infrared rays region on a specified document and registered previously) and also by using the pattern matching method, and the result of collation is transferred in a form of coincidence rate (adaptation rate) to the discriminating section 307.

The result of collation (coincidence rate) by the pattern collating section 306 is supplied as input to the discriminating section 307, which compares the coincidence rate to a threshold value and recognizes the document as a specific document if the coincidence rate is more than the threshold value, or as a non-specific document if the coincidence rate is smaller than the threshold value. It should be noted that, as the threshold value for this processing may be set by taking into considerations only the processing for discrimination of a specific document, a precision in detecting a specific document may be raised. The result of discrimination by the discriminating section 307 is transferred to the CPU 106.

Upon input of the result of discrimination by the discriminating section 307 in the specific document discriminating section 105, the CPU 106 makes a determination as to whether the document is a specific one or not (S603), inhibits an operation for recognition by a scanner by controlling the CCD driving section 102, lamp driver 110, and motor driver 112 (S604), and displays a message such as "Document inhibited to be read. Change the document" on a display panel (not shown) in the operating section 113 (S605), thus the processing being finished.

On the other hand, if the document is not a specific one, then, determination is executed as to whether the document pressing plate has been opened or not (S603a), and if it is determined that the document pressing plate has been opened, a message such as "Close the document pressing plate during scanning" is displayed (S603b), and the system control returns to Step S601. On the contrary, if it is determined that the document pressing plate has not been opened, the second scan is executed by using the R filter in the individual ray pick-up filter to read R data (image data for red color) with the CCD sensor 101, and a specific image processing is executed to the read R data in the image processing section 103 to convert the R data to C data (S607), which is then provided as output via the I/F controller 104 to an external device (S608).

Then the individual ray pick-up filter 504 is switched to the G filter and the third scan is executed to recognize G data (image data for green color) with the CCD sensor 101 (S609), and a specified image processing is executed to the read G data in the image processing section 103 to convert the G data to M data (S610), which is provided as output via the I/F controller 104 to an external device (S611).

Then, the individual ray pick-up filter 504 is switched to the B filter, the fourth scan is executed to recognize the B data (image data for blue color) with the CCD sensor 101 (S612), and a specified image processing is executed to the B data in the image processing section 103 to convert the B data to Y data (S613), which is provided as output via the I/F controller 104 to an external device (S614), thus the processing being finished.

As described above, in Embodiment 1, determination as to whether a document is a specific one or not is made depending on image data (IR data) read by the CCD sensor 101 and the IR filter of the individual ray pick-up filter 504, so that a specific document can be distinguished from a general document accurately without fail.

Figure 7:
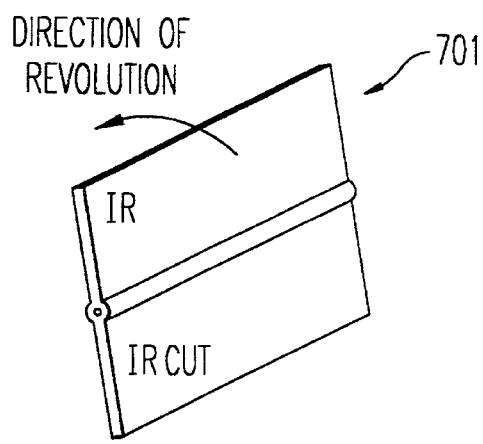
FIG. 7 is an explanation view illustrating a filter according to Embodiment 2.

In Embodiment 2 of the present invention, a CCD sensor which can sense R, B and G rays with a section sensing R which has also a sensitivity for IR is used in place of the CCD sensor 101 used in Embodiment 1. Also a filter 701 as shown in FIG. 7 is used in place of the individual ray pick-up filter 504. Other portions in this configuration are the same as those in Embodiment 1, so description and drawings concerning the portions are omitted herein.

Figure 8:
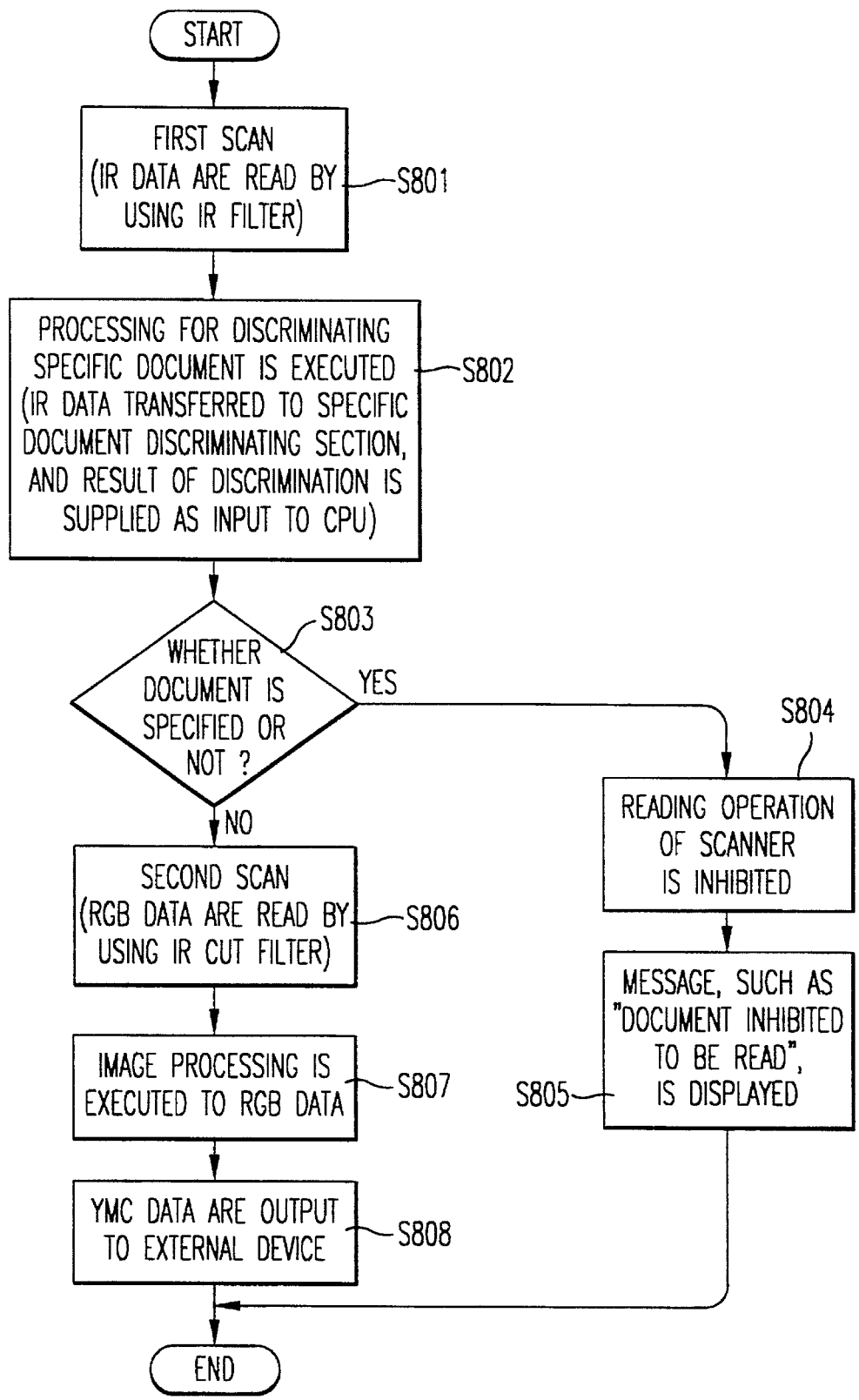
FIG. 8 is a flow chart illustrating a control program according to Embodiment 2.

Description is made below for operations of a specific document discriminating apparatus according to Embodiment 2 of the present invention having the configuration as described above. FIG. 8 is a flowchart illustrating a control program according to Embodiment 2. At first, the first scan is executed using the IR filter of a filter 701, and ID data is read by a CCD sensor (not shown), R sensing section of which has also a sensitivity for rays in an IR region (S801). Then, the read IR data is transferred to the specific document discriminating section 105, wherein a processing for discriminating a specific document is executed and the result of discrimination is supplied as input to the CPU 106 (S802).

When a result of discrimination is supplied as input from the discriminating section 307 of the specific document discriminating section 105, the CPU 106 executes a processing for determination as to whether a document is a specific one or not (S803), and if the document is a specific one, the CPU 106 inhibits operation of a scanner for recognition by controlling the CCD driving section 102, a lamp driver 110, and a motor driver 112 (S804), and displays a message such as "Document inhibited to be read. Change the document" on a display panel (not shown) of the operating section 113 (S805), thus the processing being finished.

If the document is not a specific document, the second scan is executed using the IR cut filter of the filter 701 to recognize RGB image data with a CCD sensor (S806), a specified image processing is executed to the read RGB image data in the image processing section 103 to convert the image data to YMC data (S807), which is provided as output via the I/F controller 104 to an external device (S808), thus the processing being finished. Also in Embodiment 2, the same effect as that in Embodiment 1 can be achieved.

Figure 9:
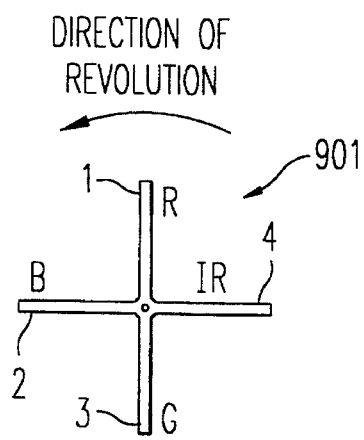
FIG. 9 is an explanation view illustrating a filter sensing each type of rays individually according to Embodiment 3.

In Embodiment 3 of the present invention, an individual ray pick-up filter 901 as shown in FIG. 9 is used in place of the individual ray pick-up filter 504 in Embodiment 1, an operation for reading IR data is executed in the middle of repetition of an operation for recognition with visible rays. It should be noted that, as the basic configuration and the basic operations are the same as those in Embodiment 1, description is made below for only different portions.

As shown in FIG. 9, an individual ray pick-up filter 901 consists of 4 filters for R, IR, G and B rays, and each of R, IR, G and B rays is picked up individually by switching these filters. At first, only R rays are picked up by the R filter indicated by the reference numeral ① during the first scan, and then the filter is turned during each scan in the order of ②, ③ and ④ to pick up image data for IR, G and B in this order.

Figure 10:
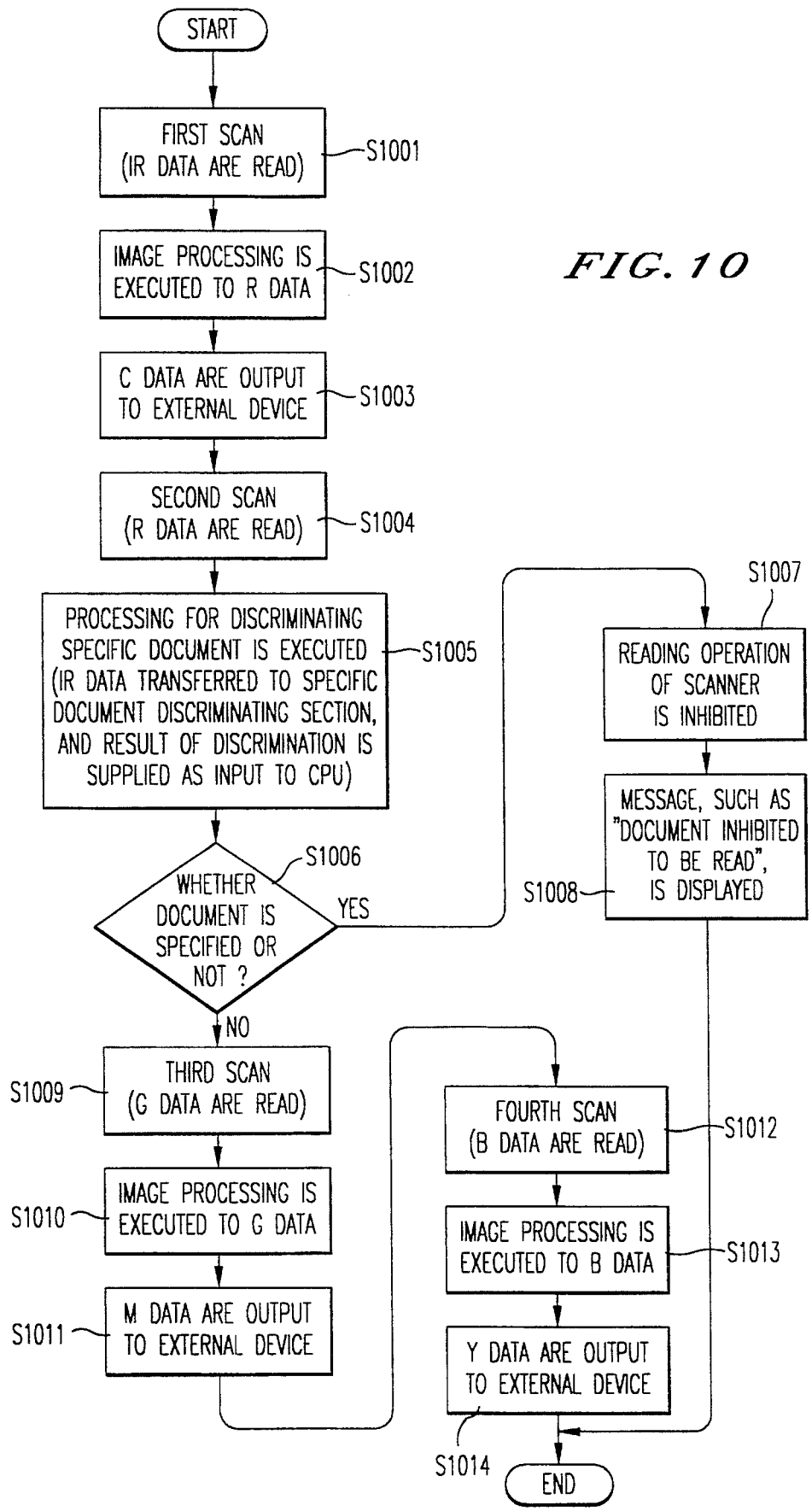
FIG. 10 is a flow chart illustrating a control program according to Embodiment 3.

FIG. 10 is a drawing illustrating a control program according to Embodiment 3. At first, the first scan is executed using the R filter of an individual ray pick-up filter 901 to recognize R data with the CCD scanner 101 (S1001), and a specified image processing is executed to the read R data in the image processing section 103 to convert the R data to C data (S1002), which is provided as output via the I/F controller 104 to an external device (S1003).

Then the second scan is executed using the IR filter of the individual ray pick-up filter 901 to recognize IR data with the CCD sensor 101 (S1004), and the read data is transferred to the specific document discriminating section 105, wherein a processing for discriminating a specific document is executed, and the result of discrimination is supplied as input (S1005).

Upon input of the result of discrimination from the discriminating section 307 of the specific document discriminating section 105, the CPU 106 makes a determination as to whether a document is a specific one or not (S1006), and if the document is a specific one, the CPU 106 inhibits a scanner's operation for recognition by controlling the CCD driving section 102, lamp driver 110, and motor driver 112 (S1007), and displays a message such as "Document inhibited to be read. Change the document" on a display panel (not shown) of the operating section 113 (S1008), thus the processing is finished.

If the document is not a specific one, the individual ray pick-up filter 901 is switched to the G filter, the third scan is executed to recognize G data with the CCD sensor 101 (S1009), and a specified image processing is executed to the read G data in the image processing section 103 to convert the G data to M data (S1010), which is provided as output via the I/F controller to an external device (S1011).

Then, the individual ray pick-up filter 901 is switched to the B filter, the fourth scan be executed to recognize B data with the CCD sensor 101 (S1012), and a specified image processing is executed to the read B data in the image processing section 103 to convert the B data to Y data (S1013), which is provided as output via the I/F controller 104 to an external device (S1014), thus the processing being finished.

In Embodiment 3, after R data is read in the first scan, IR data is read in the second scan to make a determination as to whether a document is a specific one or not, and then G data and B data are read, so that it is possible to make an accurate determination as to whether a document read by a scanner is a specific one or not without fail. In other words, if IR data is read in the first scan to make a determination as to whether a document is a specific one or not, there is a possibility that the document may be exchanged with a new one before start of the second scan, but in Embodiment 3, the possibility for a document to be exchanged with a new one is eliminated. It should be noted that, even if a scan with the IR filter is executed in the third scan, the same effect can be achieved, but in this case it takes along time to make a determination as to whether a document is a specific one or not, and for this reason the best mode for carrying out the present invention is to execute scan with the IR filter in the second scan.

It should be noted that, although infrared rays are used as invisible rays in any of Embodiments 1 to 3 above, the same effect can be achieved by using ultra-violet rays. Herein, the ultra-violet ray is defined as light having the wave length of 400 nm or below.

AVAILABILITY FOR INDUSTRIAL PURPOSE

As described above, the specific document discriminating apparatus according to the present invention and the image reading apparatus using the same are mounted in an image forming apparatus such as a coping machine, or a printer, and can advantageously be used for discriminating specific documents such as bills and securities placed on the image forming apparatus and preventing the specific documents from being copied illegally.

We claim:

1. An image reading apparatus comprising:

a reading means for reading an image on a document;

an optical means for guiding said image on said document into a light path to said reading means;

a filter means includes a filter for invisible light and a plurality of filters for visible light for moving the filter for invisible light which transmits invisible light into said light path in said optical means and for moving said filters for visible light which transmit visible light into said light path in said optical means; and a control means for providing controls so that, when determining whether a document is a specific one or not, said image on said document is read with said reading means by moving said filter for invisible light into the light path, and when reading said image on said document, said filter for invisible light is moved out of said light path and said plurality of filters for visible light are moved into said light path and said image on said document is read by said reading means.

2. An image reading apparatus according to claim 1, wherein said filter means provides filters for each of R (Red), G (Green), and B (Blue), and said control means controls so that a document is read several times by moving said filters for each of R, G and B sequentially when reading said image on a document.

3. An image reading apparatus according to claim 1, wherein said reading means comprises a CCD sensor (solid state image pick-up chip) which can sense infrared rays.

4. An image reading apparatus according to claim 1, wherein said reading means comprises a CCD sensor (solid state image pick-up chip) which can sense both visible rays and infrared rays.

5. An image reading apparatus according to claim 1, wherein said infrared rays reading means picks up rays of R (Red), G (Green) and B (Green) individually.

6. An image reading apparatus according to claim 1, wherein, when an operation for recognition with visible rays is repeated several times, an operation for recognition with said reading means is executed in the middle of repetition of operations above.

7. An image reading apparatus according to claim 1; comprising said filter means freely moving backward and forward said filter.

8. An image reading apparatus comprising:

a reading means for reading an image on a document;

an optical means for guiding said image on said document into a light path to said reading means;

a filter means includes a filter for invisible light and a plurality of filters for reach of R (Red), G (Green), and B (Blue) for visible light for moving the filter for invisible light which transmits invisible light into said light path in said optical means and for moving said filters for visible light which transmit visible light into said light path in said optical means; and a control means for providing controls so that, when determining whether a document is a specific one or not, said image on said document is read with said reading means by moving said filter for invisible light into the light path, and when reading said image on said document, said filter for invisible light is moved out of said light path and said plurality of filters for visible light are moved into said light path and said image on said document is read by said reading means;

wherein said control means determines whether a document is a specific one during a process to read said document several time by sequentially moving forward and backward each of said filters for R, G and B and for executing a reading operation with infrared light during a second scan.

\* \* \* \* \*

UNITED STATES PATENT AND TRADEMARK OFFICE
CERTIFICATE OF CORRECTION

PATENT NO. : 5,602,939
DATED : February 11, 1997
INVENTOR(S) : Tadato HASHIGUCHI, et al.

It is certified that error appears in the above-indentified patent and that said Letters Patent is hereby corrected as shown below:

On the title page, Item [73], the assignee, should read:

--Ricoh Company, Ltd., Tokyo, Japan--

Signed and Sealed this

Twentieth Day of May, 1997

Attest:

BRUCE LEHMAN

Attesting Officer     Commissioner of Patents and Trademarks